April 28, 1959 M. L. GRANT ET AL 2,884,188
FARE COLLECTION BOX
Filed Oct. 8, 1956 7 Sheets-Sheet 1

Inventors
Max L. Grant
Harry B. Miller
by Roberts, Cushman & Grover
Att'ys

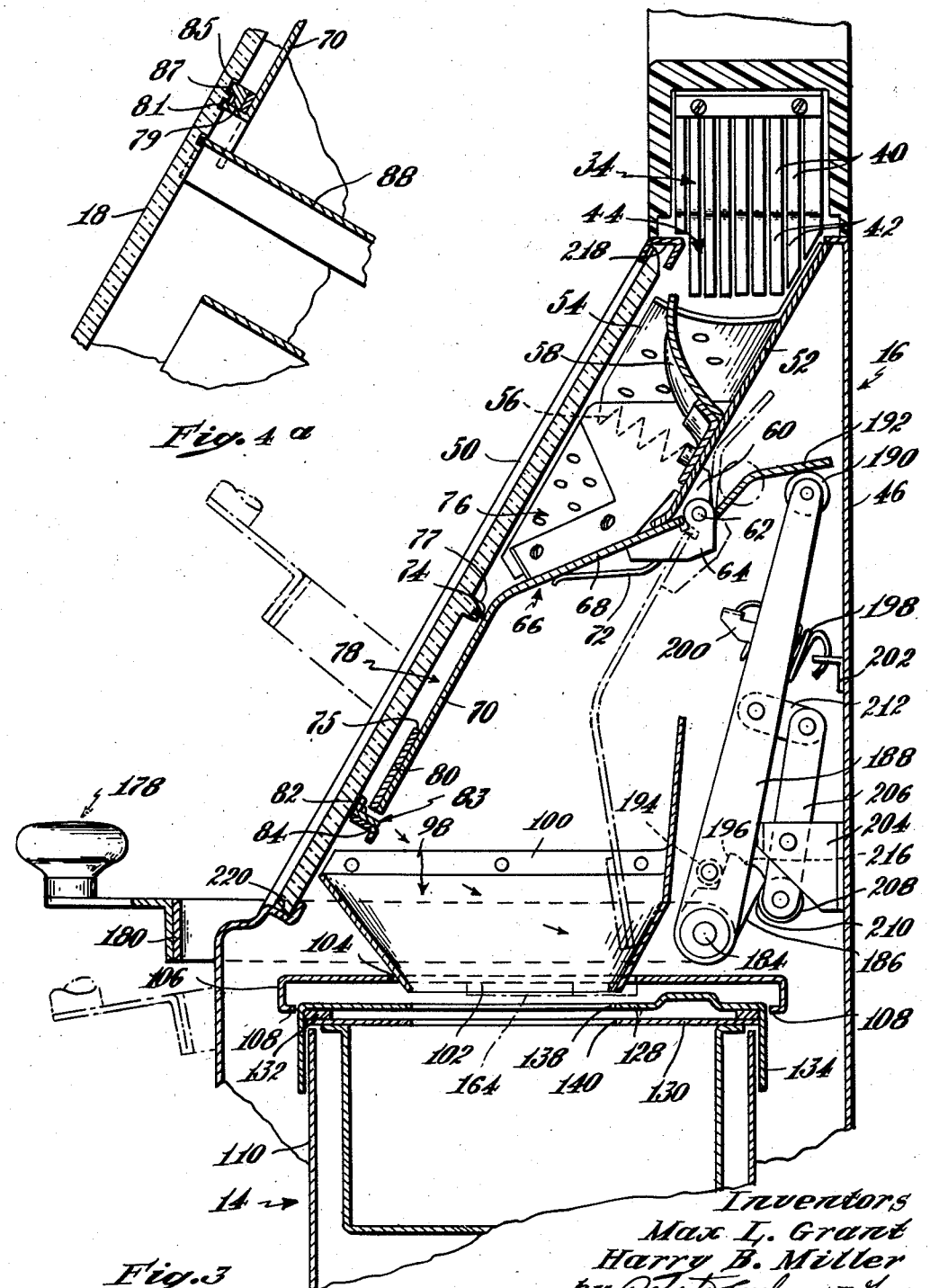

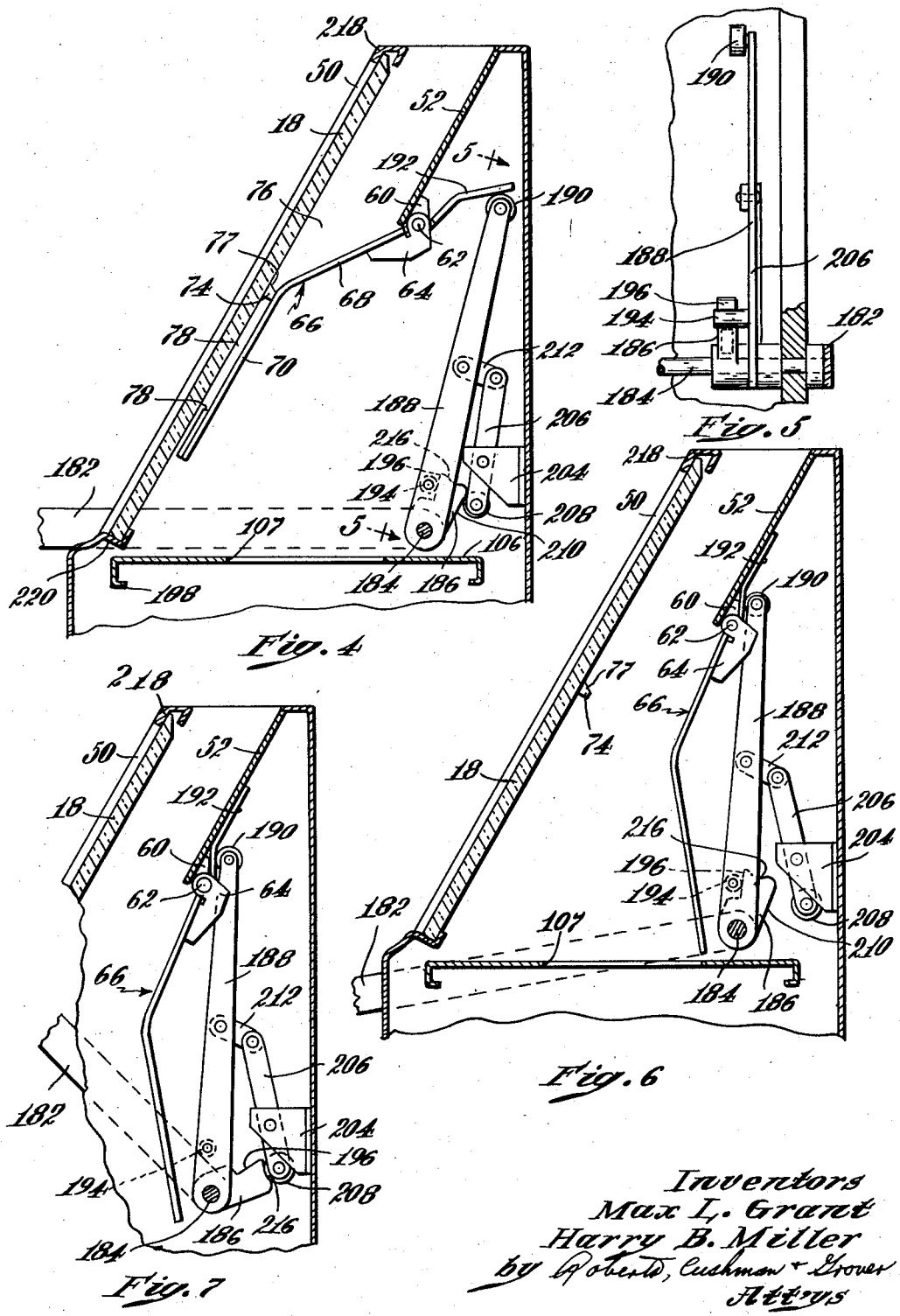

April 28, 1959

M. L. GRANT ET AL 2,884,188

FARE COLLECTION BOX

Filed Oct. 8, 1956

Inventors
Max L. Grant
Harry B. Miller
by Roberts, Cushman & Grover
Attys

April 28, 1959 M. L. GRANT ET AL 2,884,188
FARE COLLECTION BOX
Filed Oct. 8, 1956 7 Sheets-Sheet 6

Inventors
Max L. Grant
Harry B. Miller
by Roberts, Cushman & Grover
Attys

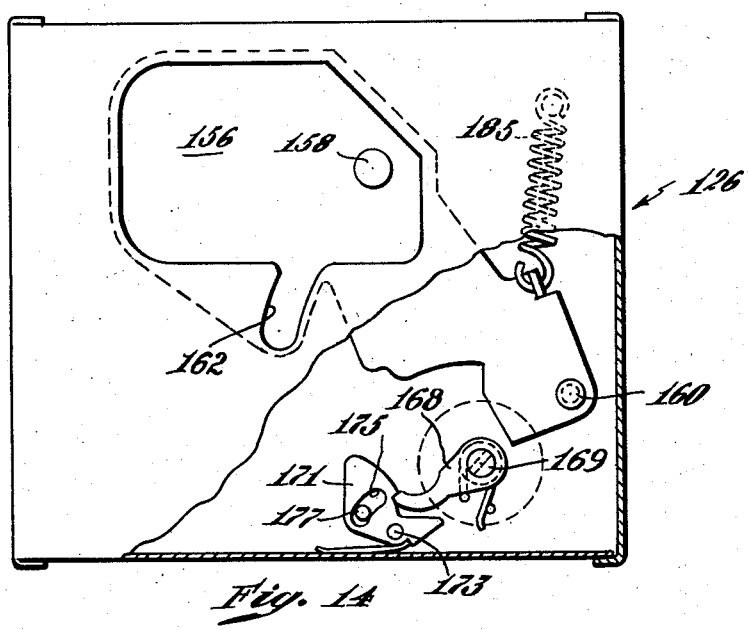
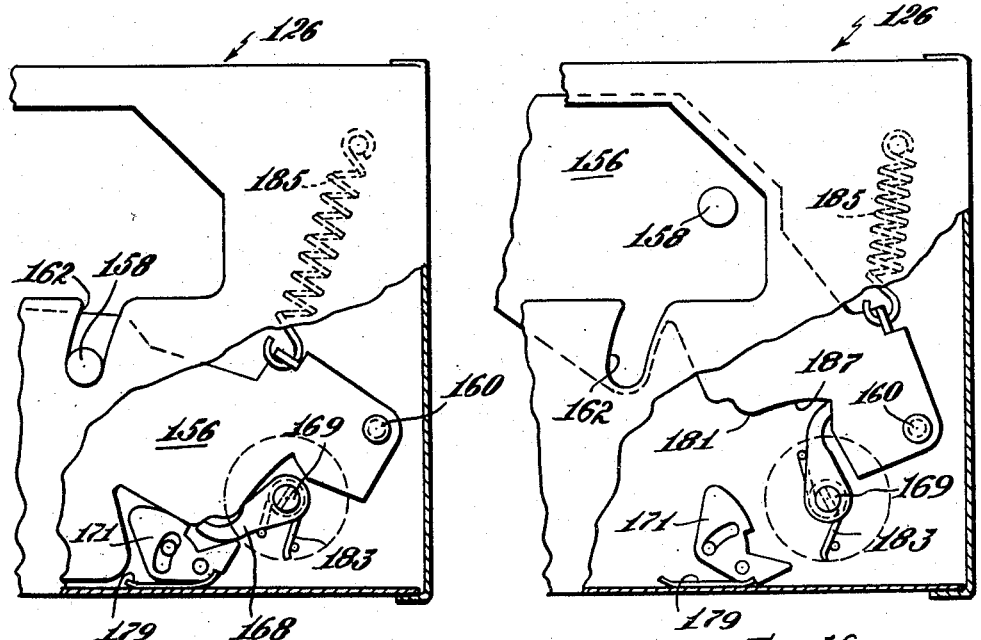

United States Patent Office 2,884,188
Patented Apr. 28, 1959

2,884,188

FARE COLLECTION BOX

Max L. Grant, Providence, and Harry B. Miller, Lakewood, R.I., assignors, by direct and mesne assignments, to Grant Development Company, Providence, R.I., a corporation of Rhode Island Application October 8, 1956, Serial No. 614,514

4 Claims. (Cl. 232—7)

This invention pertains to fare collecting apparatus, more especially to a fare box designed to receive a fare consisting of coins or tickets, or combinations of coins and tickets, and which comprises a normally locked receptacle in which the fares collect and from which the accumulated coins and tickets may be removed only by an authorized person.

One object of the invention is to provide a fare box having separate inspection chambers for tickets and coins, where tickets and coins may be held stationary for a substantial period of time during which they are in full view. A further object is to provide a fare box so designed as to provide novel and simple but effective means for separating coins and tickets on their way to the respective inspection chambers. A further object is to provide a fare box having independent inspection chambers for tickets and coins into which the tickets or coins are delivered and wherein they are exposed in optimum position for ready identification. A further object is to provide a fare collection box having an inspection chamber with a coin supporting surface colored to contrast with the coins deposited thereon. A further object is to provide a fare collection box having a coin inspection chamber capable of holding a substantial number of coins or tokens in such positions that although they may overlap to some extent they are readily identifiable. A further object is to provide a fare box having means for holding coins in position for inspection and so designed that when a predetermined weight of coins has accumulated in the inspection chamber they will be released automatically to drop into the coin receptacle, thereby decreasing the possiblity of surreptitious abstraction of coins from the apparatus. A further object is to provide a fare collecting box having provision for manually releasing tickets or coins from the inspection chambers so that will drop into the receptacle. A further object is to provide a fare collecting box having a normally locked receptacle with provision for preventing unlocking the receptacle until all coins have been released from the inspection chambers. A further object is to provide a fare collection box having a transparent plate which forms the front wall of the inspection chamber, the plate being removable to give access to said chambers, but only when the inspection chambers are empty. A further object is to provide a fare collection box having a transparent front plate forming the front wall of the inspection chambers, and which is normally locked to prevent its removal and with provision whereby, before the front plate may be removed, the receptacle must be withdrawn from the apparatus. A further object is to provide a fare collection box having a receptacle into which the fares drop from the inspection areas, said receptacle having a cover and with parts cooperating with the cover so as automatically to close and lock the top of the receptacle when the receptacle is withdrawn from the fare collecting apparatus. A further object is to provide a fare box so designed as to discourage attempts of unauthorized persons to remove fares from the inspection chamber or coin receptacle. Other and further objects and advantages of the invention will be pointed out in the following more detailed description and by reference to the accompanying drawings wherein—

Fig. 3 is a fragmentary vertical section on the line 3—3 of Fig. 2;

Fig. 4 is a fragmentary section in substantially the same plane as the lower part of Fig. 3; showing the movable rear wall of the inspection chamber in its normal position;

Fig. 4a is a fragmentary section on the line 4a—4a of Fig. 2;

Fig. 5 is a fragmentary section on the line 5—5 of Fig. 4;

Fig. 6 is a view similar to Fig. 4 but showing the movable rear wall of the inspection chambers in the dumping position and showing the position of the actuating lever when moved downwardly in performing the normal dumping operation;

Fig. 7 is a view similar to Fig. 4 also showing the movable rear wall in the dumping position, but showing the actuating lever in the UP position and with the parts locked in preparation for moving the coin receptacle;

Fig. 14 is a plan view of the cover of the vault broken away to show the details of the closure and resettable lock therefor with the lock in its reset position;

Fig. 15 is a corresponding view showing the lock released; and

Fig. 16 is a corresponding view showing the lock in its locking position.

Figures 1, 1A, 1B:
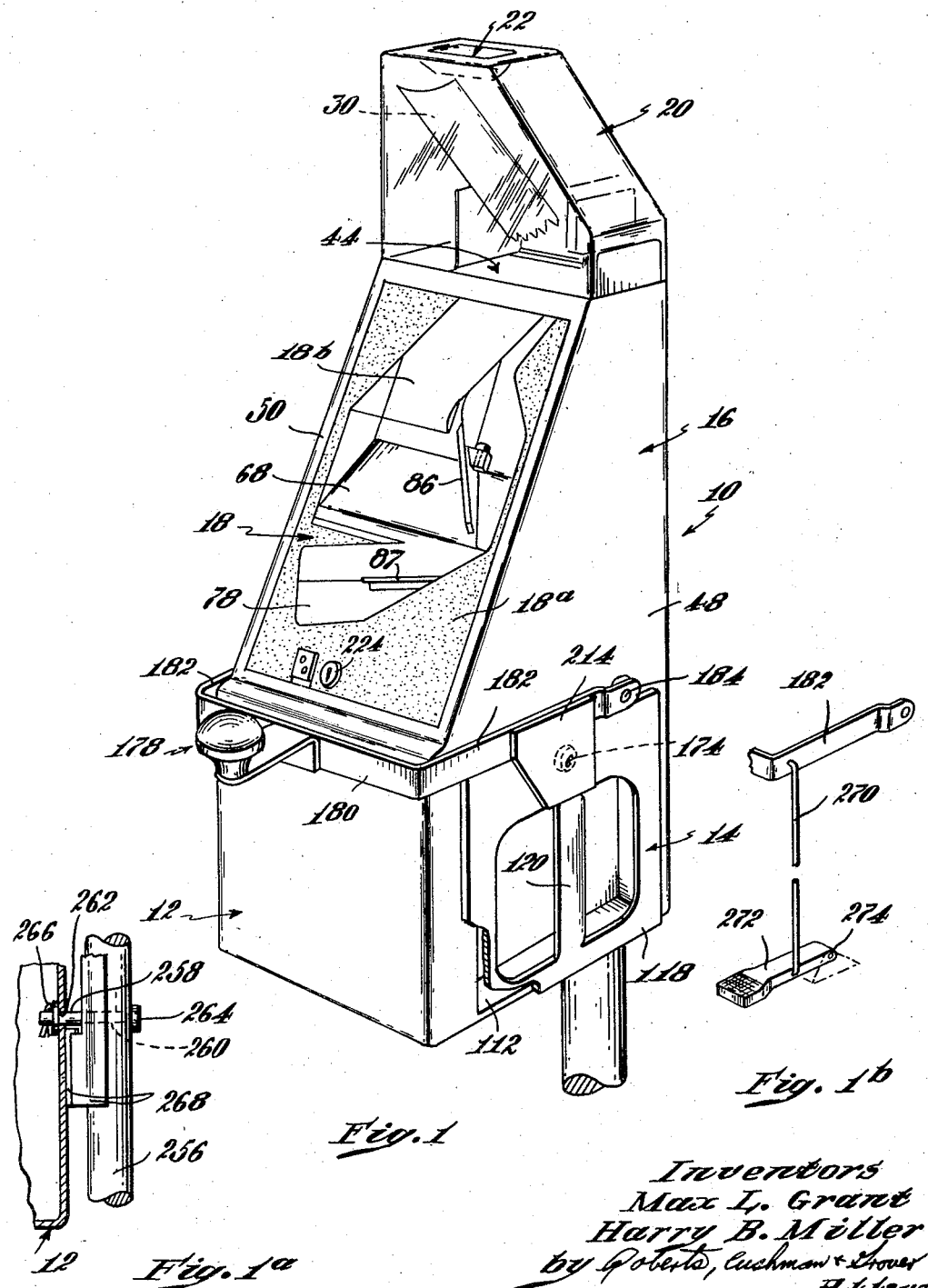
Fig. 1 is a perspective view showing a preferred embodiment of the present invention.
Fig. 1a is a fragmentary view showing a portion of a supporting post for the fare box and means for securing the box thereto.
Fig. 1b is a fragmentary view showing treadle means for releasing the coin from the inspection area.

Referring to the drawings (Fig. 1) the fare box 10 has a lower rectangular portion 12 in which there is removably situated a fare vault 14, an upper truncated portion 16 having a wall 50 containing a window 18 through which the deposited fare which is temporarily supported behind it for inspection may be seen prior to storage in the vault therebelow and a hopper 20 fastened to its reduced upper end for receiving the fare and delivering it separated as to tickets and coins to the inspection area behind the window in the wall 18.

The hopper 20 (Figs. 1, 8, 8a and 8b) is preferably comprised of a transparent or translucent material such as plastic, molded to shape and optionally tinted. Like the fare box itself it has a substantially rectangular lower part adapted to fit onto the upper smaller end of the truncated portion 16 of the fare box and a truncated upper part having at its reduced upper end a large fare receiving funnel-shaped opening 22 (Fig. 8), of substantially rectangular shape (Fig. 8a) bounded by downwardly sloping walls 24 and 26 (Fig. 8b) which narrow down to an elongate rectangular opening or slot 28 (Fig. 8a) which is long enough and wide enough to receive a deposited coin or fare edgewise but not flatwise. With reference to the front of the box which has the window in it the slot 28 is arranged so that its long dimension is disposed transversely of the box. Within the hollow hopper below the fare slot 28 there is secured a slide 30 (Figs. 1 and 8) which slopes downwardly from the left-hand wall of the hopper at an angle in the order of 45° from a point just below the slot 28, toward the base of the hopper at the opposite side and terminates above the top of the box. This slide is transversely concave and its longitudinal axis lies in a perpendicular plane which contains the long axis of the fare slot 28. At its lower extremity the slide is notched to provide a plurality of slender prongs 32 designed to make it difficult to insert and/or remove a fishing member thrust through the fare slot to prevent surreptitious removal of coins or fares.

Figure 8:
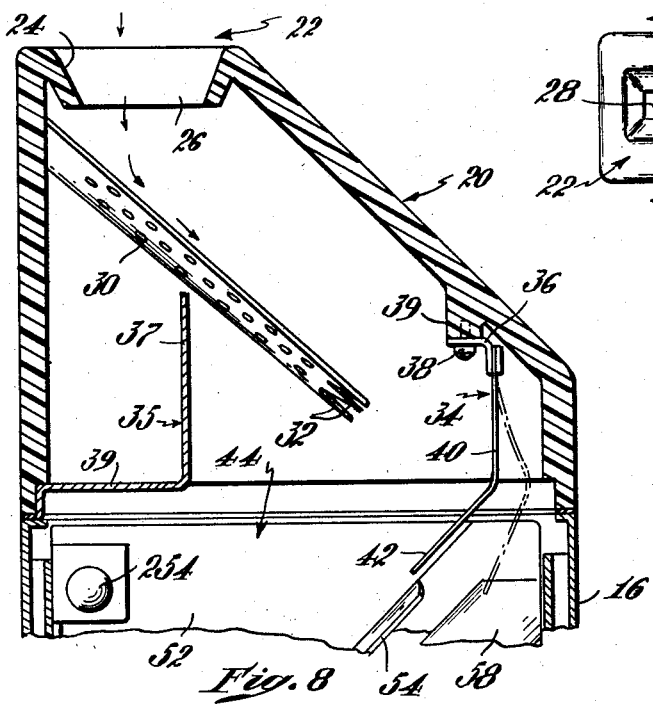
Fig. 8 is a fragmentary front to rear section through the fare receiving hopper of the box.
Figure 8A:
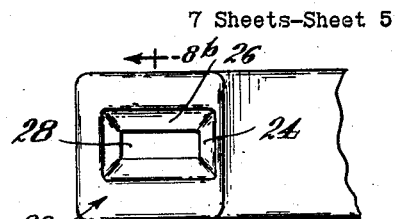
Fig. 8a is a plan view of the top of the fare hopper.
Figure 8B:
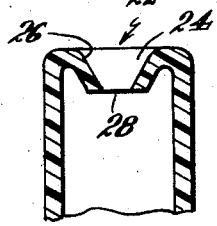
Fig. 8b is a vertical section of the top of the hopper taken at right angles to that shown in Fig. 8.

The lower end of the slide 30 terminates opposite a separator 34 (Figs. 3 and 8) designed to separate coins from tickets and to cause them to be distributed to independent inspection areas behind the window, as will be described hereinafter. The separator 34 is in the form of a plurality of spaced parallel reeds fastened at their upper ends to a bar 36 which in turn is fastened by bolts 38 to rib 39 extending between the front and rear walls of the hopper along the inside of the right-hand end wall as seen in Fig. 8 and preferably formed integral therewith. Each reed has a vertical portion 40 and an inclined portion 42, the former being situated entirely within the hopper and the latter extending downwardly to the left through an opening 44 in the top of the fare box. The separator reeds are yieldably flexible and the impact of a coin traveling down the slide 30 and projected by gravitational force against them will deflect one or more of them rearwardly to such a position as is shown in dotted lines (Fig. 8), thus permitting the coins to penetrate the separator and to travel to the rear side thereof. The reeds have sufficient inertia and resistance to deflection, however, to intercept a ticket of paper or light cardboard projected against them and to redirect its movement so that it travels downwardly and forwardly along the plane of the inclined portions 42. Beneath the slide 30 there is a baffle 35 which has vertical and horizontal portions 37 and 39 extending from front to rear.

Figure 2:
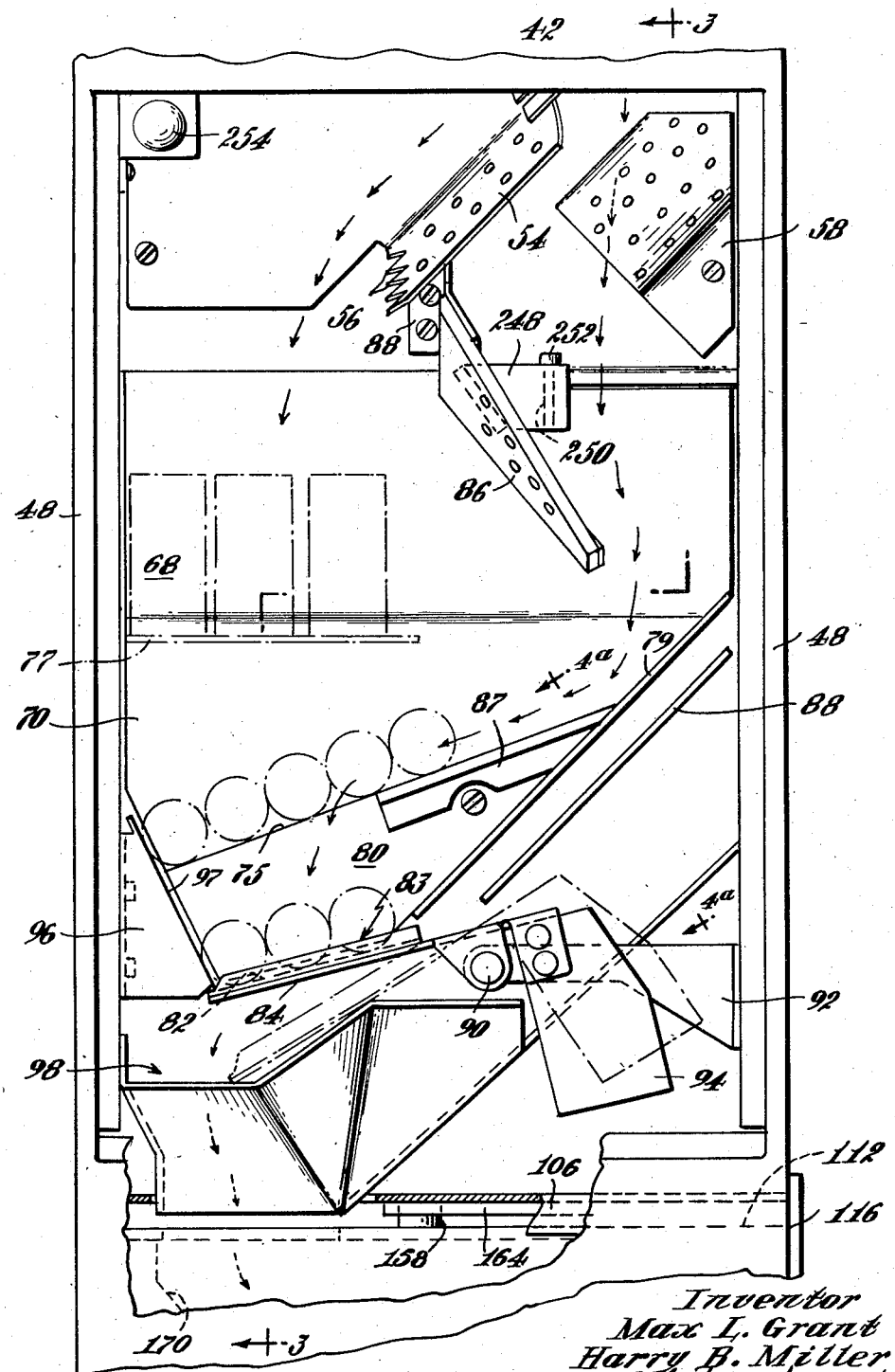
Fig. 2 is a front view looking in a direction perpendicular to the transparent front panel and to larger scale than Fig. 1.

The truncated portion 16 (Fig. 3) of the box has a vertical rear wall 46, spaced vertical side or end walls 48 and an inclined front wall 50, which front wall as previously pointed out is constituted principally by a window 18, removably locked therein, as will appear hereinafter. The window is constituted by a sheet of heavy glass, painted or otherwise covered, to conceal the interior of the box except for the inspection areas and slide paths leading thereinto. The covered area of the glass is indicated at 18a (Fig. 1), while the uncovered area is indicated at 18b. Within the box and extending downwardly from the opening 44 next to the rear wall (Fig. 3) and parallel to the front wall is a fixed partition 52 which is spaced behind and parallel to the window 18. Slides 54 and 58 (Figs. 2, 3 and 8) are fastened to the forward face of this fixed wall 52, the slide 54 being arranged to receive tickets sliding off the lower ends 42 of the separator reeds and the slide 58 being arranged to the right thereof, in a position to receive coins which pass through the separator to the rear side thereof, and gravitate downwardly through the opening 44. Slide 54 is substantially at right angles to the slide 30 and is inclined downwardly and in a direction opposite to the inclination of the slide 30. Like the slide 30 the slide 54 is transversely concave, as shown in Figs. 2 and 3, and has at its lower end a plurality of notches which provide teeth 56 which serve to make it difficult to insert or remove a fishing implement. The slide 58 is also transversely curved, as shown particularly in Fig. 3, and is fastened along one edge to the fixed wall 52 so that it forms with the wall a somewhat V-shaped channel which operates to tip the coins falling onto it upwardly on an edge so that as they gravitate downwardly they tend to fall edgewise. It is to be observed that there is a comparatively large gap between the lower end of the slide 30 and the upper ends of the slides 54 and 58 and there is no continuous surface or path along this gap operable to guide or deflect a fishing implement inserted through the coin slide at the top of the hopper to bend it as it leaves the slide 30 in a direcion to follow downwardly along the opposite inclination of the slides 54 or 58. Furthermore, it is to be noted that the disposition of the fare slot with its long axis in the same perpendicular plane as the axis of the slide 30 makes it impossible to admit a flat fishing implement with its flat side parallel to the slide hence when it reaches the right-hand wall it cannot be bent downwardly because it is inflexible edgewise.

At the lower edge of the fixed wall 52 (Figs. 2, 3, 4 and 7) there is a hinge-bar 60 which supports a pintle rod 62 on which are pivotally mounted hinge elements 64 to which are fastened a combination display and drop plate 66. The plate 66 has an inclined portion 68 extending forwardly and downwardly from the lower edge of the fixed plate 52 toward the window and a downwardly and forwardly inclined portion 70 spaced from and parallel to the window. The plate 66 is yieldably held elevated by spring fingers 72 against a stop 74 provided at the inside of the window so as to afford at the upper part of the uncovered portion 18b a display area 76 for tickets and at the lower part of the uncovered portion of the window a display area 78 of coins. The fingers 72 have spring coils at their ends which encircle the rod 62 and are anchored so that their distal ends resist counterclockwise displacement. The plate preferably has a black non-reflecting surface so as to provide a sharp contrast to the coins deposited on it, thereby to make it easier to pick out the coins at a glance for totaling and comparison with the tickets when the latter are employed to identify the correct amount of the fare which should be deposited. The display area 76 of which the inclined portion 68 of the plate 66 is the bottom is directly subjacent the lower end of the slide 54 (Fig. 2) so that ticket pieces sliding from the lower end of the slide 54 travel downwardly onto the inclined surface 68 and may be held facing the window by a transversely extending, gradually sloping ledge 77 where they may be seen until cleared or dumped from this area. The coins from slide 58 falling to the lower plate portion 70 are supported by ledges 75 and 82 on a line substantially edge to edge transversely of the inspection area and hence are especially easy to total and compare with the tickets resting on the ticket area above the line of coins for comparison if the latter, as in many cases they do, indicate the printed amount of the fare due. The ledge 77 is constituted by the upper surface of the stop 74. The lower part 70 of the plate 66 at its right-hand side is bent forwardly at right angles to provide a flat inclined slide 79 (Fig. 4a), the forward edge of which fits into a correspondingly inclined groove 81 in the inside of the window. A flat strip 80 (Figs. 2 and 3) is fastened to the face of the plate to the left of the slide 79 with its upper edge inclined downwardly at a more gradual slope than the slide 79 and provides a ledge 75 of about the thickness of a coin so that a coin rolling down the slide 79 and lying flat against the surface of the portion 70 will engage the ledge and roll toward its lower end. The strip 80 is not as thick as the slide 79 is wide and part of the space between it and the window is filled by a slide 87 fastened to the strip 80 with its upper edge coinciding with that of the strip 80. The slide 87 extends only part way along the strip 80 and its outer edge fits into a groove 85 in the window. The upper edges of the strip 80 and the slide 87 provide a surface of at least double the thickness of a coin, thus coins falling onto the slide 79 will travel downwardly along the ledge 75 until it is filled up whereupon additional coins will roll along the slide 87 past the line of coins on the ledge 75 over the end of the slide and down onto a ledge 82 situated below it. The ledge 82 (Fig. 3) is formed by one wall of a channel member 83 fixed to a bracket 84 (Fig. 2). The ledge 82 closes the space between the lower end 70 of the plate 66 and the window and more or less parallels the ledge 75. Coins which roll off the slide 87 or are not dropped flat against the wall 70 and hence, which may run off the edge of the ledge 75, will drop downwardly onto the second ledge 82 and be retained on edge between the window and the strip 80. Thus the ledges 75 and 82 provide vertically spaced places for a plurality of coins lined up on edge for inspection (Fig. 2), so that the totals of the several fares may be determined before they are dumped into the vault, when for example, a number of passengers get on at one stop.

The coins are guided as they fall from the end of the slide 58 to the ledges 75 and 82 by a deflector slide 86 (Fig. 2) and by the slide 79. The deflector slide 86 is fastened by a bracket 88 to the fixed plate 52 and inclines downwardly to the right over the front face of the plate 66, at right angles to the axis of the slide 58, serving to interrupt and deflect the coins to the right away from the ticket inspection area and to the upper end of the slide 79. The slide 79 is inclined downwardly and to the left, substantially at right angles to the deflector slide 86. It is to be observed that gaps exist between each of the slides 58, 86 and 79 and that there are no continuous surfaces or portions of the walls between these slides which tend to redirect or bend a fishing implement in a direction favorable to following the zigzag path defined by these slides into the display area. To further provide an obstacle to a fishing implement the slides 54, 58, 86 and 79 may have perforations through them too small to admit a coin but large enough to intercept the end of a fishing implement and thus prevent sliding of the implement in the event that somehow its end became engaged with one of the lower slides in spite of the gaps therebetween.

The bracket 84 for the lower one of the ledges 82 is pivotally supported adjacent the lower edge of the plate 66 on a horizontal pin 90, the latter being fixed to the end of a bracket arm 92 fastened to the wall of the box. A portion of the bracket extends rearwardly of the pivot and has fastened to it a counterweight 94 which normally holds it engaged with the lower edge of the drop plate 66. The counterweight 94 is designed so that when the number of coins deposited on the ledge 82 reach a predetermined weight the bracket 84 will automatically tilt downwardly releasing the coins resting on the ledge 82 so that they gravitate downwardly into the coin vault 14, heretofore mentioned. This construction operates both to relieve the operator of having to dump the coins manually when a large number of passengers get on at one stop and he is busy making change, answering questions and operating the vehicle, and to prevent the possible dishonest operator from letting the coins build up in the inspection area until they can be reached for unauthorized removal. While the coins rest on the ledges 75 and 82 they are held in place by an end stop 96 bolted to the wall of the box which has a surface 97 disposed substantially at right angles to the ledges.

The tickets and coins are periodically dumped by moving the drop plate 66 rearwardly from the window, as will appear hereinafter, into a subjacent funnel 98 (Figs. 2 and 3) having a wide upper end 100 into which the lower edge of the plate 66 swings, as shown by the arrows in Fig. 3, when lowered, and a smaller lower end 102 which projects through an opening 104 in a horizontally located positioning member 106 fixed with the rectangular portion of the box and having spaced parallel guideways 108—108 for receiving and slidably guiding the fare vault into and out of the box.

Parallel to the slide 79 there is a flat plate 88 which extends from the window rearwardly to the back wall and which inclines downwardly to the open mouth of the funnel 98 so that if the drop plate is swung violently to a dumping position any coins which are thrown off will be caught by this plate and directed downwardly into the funnel.

Figure 11:
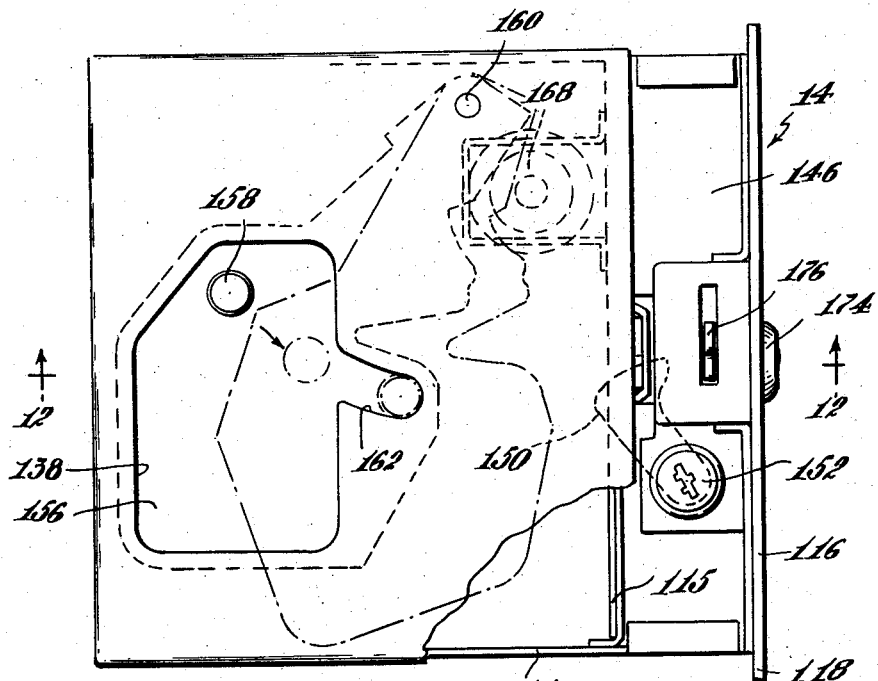
Fig. 11 is a plan view of the coin receptacle removed from the fare box and with its cover closed, but showing the partially open position of the cover in broken lines.
Figure 12:
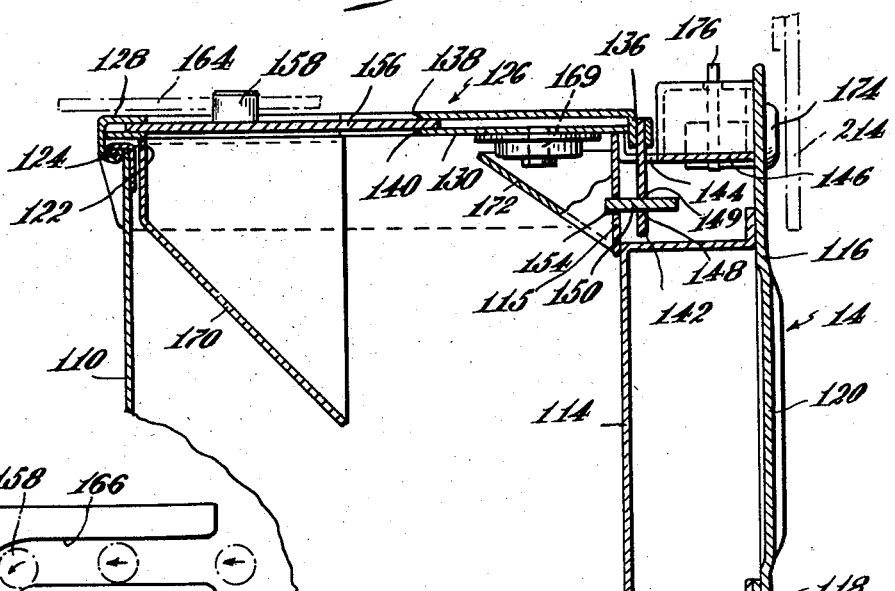
Fig. 12 is a fragmentary vertical section substantially on the line 12—12 of Fig. 11.

The fare vault is, as shown in Figs. 3, 11 and 12, substantially rectangular in cross-section. The vault is slidable through a rectangular opening 112 (Figs. 1 and 2) in one side of the box, the right as shown in Fig. 1. The front side of the vault has double walls 114 and 116. The wall 114 extends part way up from the bottom and is bent forwardly and welded to the inside of the front wall. Above the bent portion of the wall 114 there is a vertical plate 115 and a horizontal plate 146 welded respectively to the walls 114 and 116 and to each other. The wall 116 has laterally extending margins 118 which by engagement with the marginal edge of the opening 112 exactly locates the position of the vault within the box so as to be in registration with the lower end of the funnel 98. The front wall 116 is cut out symmetrically to provide a vertical bar 120 (Figs. 1 and 12) which affords a handle which may be grasped to withdraw the vault when desired.

The rear wall of the vault (Fig. 12) has fast to its upper edge hinge brackets 122 which carry a hinge pin 124 pivotally supporting a cover 126. The cover is comprised of plates 128 and 130 held in spaced parallel relation by spacer bars 132 (Fig. 3) and has at its lateral edges depending flanges 134 which extend downwardly along the sides of the vault a sufficient distance to prevent successful insertion of an implement designed to force the cover. The front edge of the cover has an abbreviated flange 136 to which is fastened a haft 148 for locking the cover in place, as will appear. The plates 128 and 130 have registering openings 138 and 140 (Fig. 3) which in turn register with the lower end 102 of the funnel 98, when the vault is positioned within the box through which the fare cleared by swinging the drop plate 66 rearwardly will pass into the vault. The top is locked in place by the afore-mentioned haft 148 which extends downwardly through an opening 144 in the plate 146. The haft has an opening 149 near its lower end into which the heel of a latch hook 150 is inserted, the latter being mounted at the lower end of a spindle extending downwardly from a lock 152 mounted on the plate 146 (Fig. 11). The spindle is turned by inserting a key in the lock and turning it in a counterclockwise direction, as shown in Fig. 11, to lock the cover down. Rearwardly of the haft the plate 115 also has a slot 154 for receiving a portion of the heel of the hook so that the strain on the latch hook is shared by the vertical plate 115 as well as by the horizontal plate 146.

Figure 13:
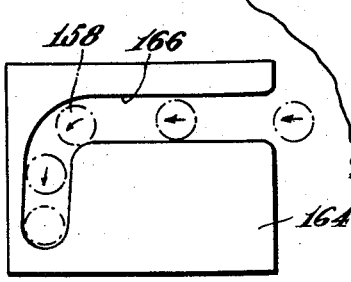
Fig. 13 is a diagrammatic plan view illustrating the means for controlling the position of the cover as the receptacle is inserted and withdrawn from the fare box.

Between the plates 128 and 130 (Fig. 12) of the cover 126 there is mounted a closure 156 for covering the openings 138 and 140 when the vault is withdrawn from the box to prevent unauthorized access to the box, which closure is adapted to be automatically opened to uncover the openings when the vault is inserted into the box. The closure 156 has for this purpose fast to its upper side and projecting through the upper opening 138 a stud 158 and is pivoted at 160 (Fig. 11) so as to swing in a horizontal plane between the plates. To permit completely uncovering the openings 138 and 140 one edge of the opening 138 has a notch 162 into which the stud 158 may be moved far enough to move the left-hand edge of the closure beyond the right-hand edge of the opening. Movement of the closure is effected by engagement of the stud 158 with a cam plate 164 (Fig. 13) having a cam groove 166 therein through which the stud 158 projects. The cam groove 166 is so shaped that as the vault is thrust into the box the cover is swung about its pivot to an open position and as the vault is withdrawn it is swung in the opposite position to a closed position. Adjacent the forward end of the closure there is a resettable lock 168 (Figs. 11 and 14). The lock 168 is normally constrained by a latch 171 in an inoperative position out of contact with the edge of the closure 156 so that as the vault is thrust into the box the closure can be moved to an open position. When the closure reaches its open position, as shown in Fig. 15, it engages the trip 171 so as to release the lock 168. Consequently, when the vault is withdrawn, the lock 168 follows the edge of the closure and when it reaches its completely closed position the lock 168 becomes engaged with an arcuate shoulder 187. The arcuate shoulder is on center with the axis about which the lock swings so that the closure becomes locked and cannot be opened without first lifting the cover 126 and employing a key to reset the lock. Thus when the vault is withdrawn normally its cover 126 is locked down and the closure 156 is locked in its closed position so that access can be had to the vault only by means of keys which fit the locks 152 and 168.

The lock 168 (Figs. 14 to 16 inclusive) is fast to a spindle 169 which is accessible from the inside of the cover only and may be turned by inserting a key in a slot in its inner end. By turning the spindle the lock may be swung counterclockwise, as shown in Fig. 14, to engage its end with a latch plate 171 pivoted on a pin 173 and angularly movable throughout the length of a slot 175 which embraces a pin 177. A spring 179 fast to the plate and bearing against an edge of the cover holds the plate engaged with the lock. When the vault is inserted into the box the stud 158 engages with the groove 166 and pushes the closure 156 open. As the closure is pushed open a cam edge 181 strikes the latch plate 171, shifting it counterclockwise so as to disengage it from the lock 168 thereby releasing the latter which then bears against the edge of the closure and is held thereagainst by a spring 183 (Fig. 15). When the vault is subsequently removed the closure is yieldably urged toward its closed position by a spring 185 and as it moves the lock 168, as pointed out above, follows it, ultimately engaging at the closed position of the closure an arcuate notch 187 which has as its center the axis of the pin 169. Thus, since the pressure exerted on the lock is radial with respect to its axis of rotation there is no turning movement operable to swing the lock about its center and hence any attempt to open the closure by prying on it is ineffective. The lock and the closure cannot be swung to an open position until a key is used to turn the lock to its inoperative position for reengagement with the latch plate 171.

The underside of the cover 126 has a baffle 170 which slopes downwardly and forwardly from the openings 138 and 140 which cause the coins dropped through these openings to slide downwardly at an angle so that they will be deposited near the center of the box. A baffle 172 is preferably located below the lock 168 to prevent coins interfering with the latch in the event that the vault is inverted.

The vault is locked in the lower part of the box by a lock 174 fixed in the front wall 116 and operable by a key to thrust a bolt 176 or withdraw it from engagement with the upper marginal edge of the box at the opening 112. This lock 174 is normally concealed by a plate 214 (Figs. 1 and 12) so that it cannot be unlocked without clearing the coins from the inspection area, as will appear hereinafter.

To clear the inspection areas of tickets and coins a handle 178 (Figs. 1, 3 and 4 to 7) is mounted externally of the box which may be grasped and moved up and down. The handle is fastened to a horizontal, transversely extending bar 180 at the front of the box having spaced parallel arms 182—182 extending rearwardly from its opposite ends along the opposite sides of the box which in turn are fastened at their rear ends to a horizontally disposed rod 184 journaled in the walls of the box. On this rod 184, as shown in Figs. 3 to 7 inclusive, there is mounted a cam 186 and an arm 188, the cam being fixed to the rod and the arm being free thereon. The upper or distal end of the arm 188 has on it a roller 190 which engages an extension or finger 192 extending rearwardly from the drop plate 66 so that counterclockwise rocking movement of the arm 188 about the rod 184 elevates the finger 192 thus swinging the drop plate 66 downwardly and rearwardly from the window. Rearward swinging movement of the drop plate is limited by engagement of the finger 192 with the backside of the fixed plate 52. A roller 194 mounted on the lower part of the arm 188 engages an edge 196 of the cam 186 and is held thereagainst by a spring 198 (Fig. 3) stressed between a bracket 200 on the arm and a bracket 202 fast to the rear wall 46 of the box, which through the cam supports the handle in a normally horizontal position. Movement of the handle 178 downwardly, as shown in Fig. 3 in dotted lines, and as in Fig. 6 in full lines, tilts the arm 188 in a counterclockwise direction so as to swing the drop plate 66 rearwardly to permit the fares to drop into the funnel 98 and hence into the vault. Behind the arm 188 there is a bracket 204 fastened to the rear wall of the box on which there is pivotally mounted a lever 206. The lower end of this lever has on it a roller 208 which engages an edge 210 of the cam. The upper end of the lever is connected by a link 212 to the arm 188. Upward movement of the handle 178 will therefore also tilt the arm 188 forward to swing the drop plate downwardly. Normally the handle 178 is held in a substantially horizontal position by the spring 198. As previously stated it is desirable to make it impossible to unlock the lock 174 until the inspection areas are cleared of the fares so that when the vault is removed there will be no fares remaining in the box. To this end the shield 214 is fastened to the right-hand one of the arms 182 (Fig. 1) so as to overlie the lock when the handle is in its normally horizontal position. The shield 214 prevents placing a key in the lock until the handle 178 is elevated and elevation of the handle as previously stated immediately results in swinging the drop plate 66 rearwardly and downwardly from the window so that any fares in the places of display must drop into the vault.

Since it would be difficult to hold the handle 178 in an elevated position and at the same time insert a key in the lock 174, the cam 186 has an upper notched edge 216 (Figs. 3, 6 and 7) which may be engaged with the roller 208 as shown in Fig. 7 to hold the handle elevated in a temporarily latched position while the vault is being unlocked and removed. The notch 216 may be disengaged from the rolls 208 by pulling the handle down.

Figure 10:
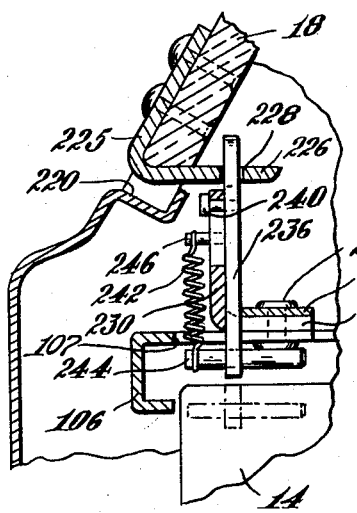
Fig. 10 is a section on the line 10—10 of Fig. 9.
Figure 9:
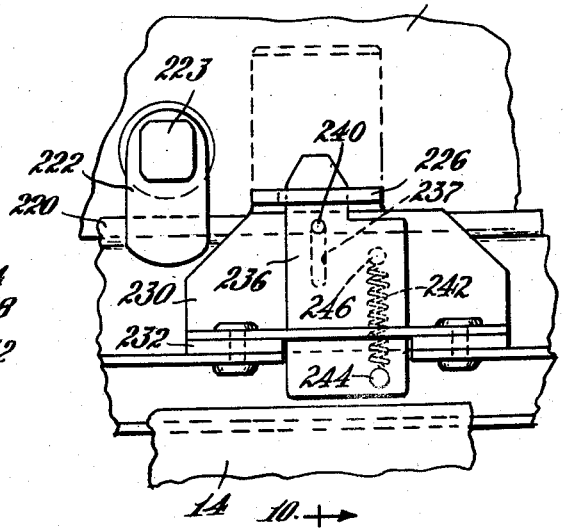
Fig. 9 is a fragmentary front view of the means for locking the transparent front panel in place.

It is desirable to have access to the display areas as for example to remove coins or fares which may become jammed. Hence the window 18 is set into the wall 50 along its upper edge in a U-shaped member 218 (Fig. 3) and along its sides and bottom edge in a right angle member 220 which has an inwardly extending flange at its rear side and is open at the front so that the window can be lifted outwardly at its lower edge and drawn down to disengage its upper edge from the U-shaped groove to permit complete removal. The lower edge of the window is fixed and locked in place by a pivoted latch plate 222 (Fig. 9) fastened to the inner end of a bolt 223 extending from a lock 224 (Fig. 1) fastened in a hole in the window and accessible from the outside. The latch plate at the inner side of the window engages the inner side of the flange at the rear of the member 220. The latch plate 222 is swingable by a key inserted in the lock 224 externally of the window to disengage it from the flange. This does not completely release the window for in addition there is another lock for holding the window in place which is inaccessible for unlocking except by removing the vault. This second lock (Figs. 9 and 10) is constituted in one part by an angle member 225 bolted to the window glass at its lower edge which has an inwardly projecting horizontal flange 226 through which there is a slot 228 adapted to receive the other part, a sliding bolt 236. The bolt is supported by a bracket having a vertical portion 230 and spaced horizontal feet 232 by which it is fastened to the top of the positioning member 106, by bolts 234. The bolt is held against the vertical portion of the bracket partly by a guide plate 238 fastened to the feet and by a pin 240 fixed to the bolt which extends through a slot 237 in the vertical portion 230 and has a head engaged with the front side thereof. A spring 242 stretched between a pin 246 fixed to the portion 230 and a pin 244 fixed to the bolt 240 holds the bolt engaged within the slot 228. The lower end of the bolt 236, as shown in Figs. 9 and 10, extends through an opening 107 in the positioning member 106 to a position directly above the top of the vault 14 and its upper end cannot be disengaged from the slot 228, that is, by pulling it downwardly without first removing the vault, hence it will be seen that the window cannot be unlocked even after the latch 222 is disengaged until the vault is withdrawn from the box. The bolt is disengaged after the vault is removed by reaching in and manually pulling it down in opposition to the spring 242. As previously stated the vault cannot be withdrawn without first clearing the inspection areas hence it is clear that by the time the window is released for removal all of the fares must have been deposited in the box except for fares which may have become jammed along the slides.

A horizontal arm 248 is fastened to the slide 86 (Figs. 1 and 2) so as to be substantially parallel to the window and to be visible therethrough. The distal end of the arm has in it a vertical hole 250 which loosely receives a headed pin 252 of distinctive color. As long as the box is supported in an upright position the pin 252 will stay in the hole. If the box is inverted for the purpose of tampering the pin will fall out and cannot be restored without taking the window off. Thus an unsuccessful attempt to tamper can be ascertained.

There may a lamp 254 in the box to illuminate the fare displaying areas when desired.

The fare box is supported on a post 256 (Fig. 1a) which has a suitable footing by a bracket and bolt 258 which is inserted through holes 260 and 262 in the post and the rear wall of the box. To prevent unauthorized removal of the box from the supporting post the bolt has a head 264 at its outer end engaged with the post and a cotter pin 266 or an equivalent element at its inner end located inside of the box so that access cannot be had to remove it and hence release the bolt until the vault has been unlocked and removed from the lower portion 12 of the fare box 10. The bracket is constituted by slidably interengageable parts 268 on the box and post respectively, which serve to hold the box vertically.

In some situations it is desirable to employ a treadle for dumping the coins from the display area thereby to relieve the driver from having to use his hands when otherwise occupied. Accordingly and by way of example there is shown in Fig. 1b a rod 270 connected at one end to one of the bars 182 and at its other end to a treadle 272 pivoted at 274. The treadle may be operated to draw the bar 182 down so as to dump the coins and will not interfere with manual swinging of the handle 178 up or down.

This application is a continuation-in-part of our pending applications, Serial No. 349,752, April 20, 1953, now abandoned, and Serial No. 408,823, February 8, 1954, now abandoned.

It should be understood that the present disclosure is for the purpose of illustration only and that this invention includes all modifications and equivalents which fall within the scope of the appended claims.

We claim:

1. In a fare box, a hopper for receiving a deposited fare, inspection areas for temporarily supporting a fare composed of coins and tickets in different arrays for examination of coins and tickets separately, said areas having spaced supporting ledges bounded by narrowly spaced walls for confining the tickets and coins on edge, one of the walls being transparent, a plurality of slides arranged in descending zigzag fashion for conducting the fare to the places of inspection behind the transparent wall, said slides having gaps therebetween at the places where they change direction, and a separator located in the path of gravitational descent of the fares as they leave the first slide, said separator being constituted by a plurality of depending spaced parallel flexible fingers rearwardly yieldable under the impact of coins to permit them to pass behind the separator and of sufficient inertia to arrest and divert tickets falling against it, the next of the succeeding slides being arranged one behind the other and in substantially parallel relation to receive respectively the coins and the tickets, the tickets sliding from the front side of the separator downwardly the front one of the slides into their inspection area and a pair of said succeeding slides below the rear one of the preceding pair of slides conducting the coins away from the ticket inspection area, downwardly and forwardly below the ticket inspection area to the coin inspection area.

2. In a fare box, a hopper, a vault, a display area along which coins pass from the hopper to the vault, said display area including a window through which the coins may be inspected, vertically spaced supporting ledges in the display area adapted to receive coins on edge facing the window and a succession of slides for conducting the coins from the hopper to the supporting ledges, the upper edge of the last of said slides in the succession leading to the ledges coinciding with the upper edge of the upper ledge, being wider than the upper ledge and terminating part way along the upper ledge above the upper end of the lower ledge, said last-named slide being adapted to guide coins onto the upper ledge until it is filled and then to guide coins past those on the upper ledge downwardly therealong over its end onto the lower ledge.

3. A fare box of the kind which has a hopper for the reception of coins, an inspection area including an inclined transparent plate through which the coins may be viewed, means normally operative to hold the coins which drop from the hopper into said inspection area for inspection, a removable coin receiving box arranged to receive coins released from the inspection area, means for locking the box, and means for releasing coins from the inspection area so that they may drop into said box, guard means operative to prevent access to the box locking means so long as any coin remains in the inspection area, and means operative to retract the guard means thereby to give access to the locking means concomitantly with the actuation of the coin release means; wherein the means normally operative to hold the coins in the inspection area comprise a first retaining means in the form of an inclined plate disposed rearwardly of the transparent panel and parallel thereto, a transversely disposed inclined track on the plate for supporting the coins in the inspection area while leaning against said plate, means for supporting the plate for swinging movement about a horizontal axis, rearwardly of the transparent plate, and means normally holding the plate parallel to the transparent plate, a second retaining means in the form of a transversely inclined rail disposed behind the transparent plate below the first track by an amount greater than the diameter of the largest coin to be included in the fare, means pivotally supporting said second track near its upper end for tilting movement about a horizontal axis, perpendicular to the axis about which the plate swings, a counterweight which normally holds said second coin retaining means in position to receive coins which, in passing through the inspection area, escape the first coin retaining means, the counterweight being so designed as to permit said second coin retaining means to tip in response to a predetermined weight of coins resting thereon, so that all of such coins fall into the coin receiving box, said means for releasing coins from the inspection area comprising a lever fixed to the plate, a handle which is movable upwardly or downwardly from a normal position, means actuatable by the handle when moved either upwardly or downwardly from said normal position to actuate said lever and thereby to swing the plate rearwardly from the transparent panel so as to drop coins therefrom, and means operative when the lever is swung in one of said directions to hold the plate in its rearward coin releasing position.

4. A fare box according to claim 3, wherein the said transparent panel is removable from the fare box, a hasp is fast to the inner side of said transparent panel, a bolt is mounted with its upper end extending through the hasp and with its lower end adjacent the top of the vault, and a spring holds the bolt with its upper end in the hasp, said bolt being retractable only upon removal of the vault to release said transparent panel.

References Cited in the file of this patent

UNITED STATES PATENTS

| | | |
|---|---|---|
| 357,756 | Beaman | Feb. 15, 1887 |
| 486,111 | Krepps | Nov. 15, 1892 |
| 1,121,063 | Beck | Dec. 15, 1914 |
| 1,234,707 | Whistler | July 24, 1917 |
| 1,353,970 | Mullatt | Sept. 28, 1920 |
| 1,805,422 | Smith | May 12, 1931 |
| 2,010,877 | Morell | Aug. 13, 1935 |
| 2,079,255 | Jones | May 4, 1937 |
| 2,199,086 | Weatherford | Apr. 30, 1940 |
| 2,318,410 | Mills | May 4, 1943 |
| 2,338,575 | Daugherty | Jan. 4, 1944 |
| 2,546,498 | Evans | Mar. 27, 1951 |
| 2,642,073 | Ingraham | June 16, 1953 |
| 2,746,675 | Grant | May 22, 1956 |
| 2,798,664 | Grant | July 9, 1957 |